United States Patent
Kim et al.

(10) Patent No.: US 11,116,086 B2
(45) Date of Patent: Sep. 7, 2021

(54) ELECTRONIC APPARATUS

(71) Applicant: Samsung Display Co., Ltd., Yongin-Si (KR)

(72) Inventors: TaeHyun Kim, Seoul (KR); Donghwan Shim, Hwaseong-si (KR); Seungmin Lee, Hwaseong-si (KR); Sunhee Lee, Hwaseong-si (KR); Jonghyun Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/794,921

(22) Filed: Feb. 19, 2020

(65) Prior Publication Data
US 2020/0315038 A1    Oct. 1, 2020

(30) Foreign Application Priority Data

Apr. 1, 2019 (KR) .................. 10-2019-0038060

(51) Int. Cl.
*H05K 5/00* (2006.01)
*G06F 1/16* (2006.01)

(52) U.S. Cl.
CPC ........... *H05K 5/0017* (2013.01); *G06F 1/165* (2013.01); *G06F 1/1626* (2013.01)

(58) Field of Classification Search
CPC combination set(s) only.
See application file for complete search history.

(56) References Cited

U.S. PATENT DOCUMENTS

| | | | |
|---|---|---|---|
| 6,016,176 A * | 1/2000 | Kim | G06F 1/1683 349/84 |
| 8,194,399 B2 * | 6/2012 | Ashcraft | G06F 1/1652 361/679.05 |
| 8,873,225 B2 * | 10/2014 | Huitema | G06F 1/1656 361/679.01 |
| 9,020,571 B2 * | 4/2015 | Chi | G06F 1/263 455/575.1 |
| 9,239,594 B2 * | 1/2016 | Lee | G06F 1/1652 |
| 9,934,706 B2 * | 4/2018 | Lim | H04M 1/0268 |
| 9,942,367 B2 * | 4/2018 | Lee | G06F 3/0346 |
| 9,985,236 B2 * | 5/2018 | Kim | H01L 27/3276 |
| 10,008,135 B2 * | 6/2018 | Lim | H05K 5/0226 |

(Continued)

FOREIGN PATENT DOCUMENTS

| KR | 1020160002662 A | 1/2016 |
|---|---|---|
| KR | 101642808 B1 | 7/2016 |

(Continued)

*Primary Examiner* — Lisa Lea-Edmonds
(74) *Attorney, Agent, or Firm* — Cantor Colburn LLP

(57) ABSTRACT

An electronic apparatus includes a display panel including a first surface portion, a second surface portion, and a third surface portion which is disposed between the first surface portion and the second surface portion. The electronic apparatus operates in one of a first mode and a second mode. When the electronic apparatus operates in the first mode, the third surface portion is bent from the first surface portion, and the second surface portion is bent from the third surface portion. When the electronic apparatus operates in the second mode, the first surface portion, the second surface portion, and the third surface portion are substantially parallel to each other.

20 Claims, 15 Drawing Sheets

(56) References Cited

U.S. PATENT DOCUMENTS

| | | | |
|---|---|---|---|
| 10,043,421 B2 * | 8/2018 | Koo | G06F 1/1652 |
| 10,063,677 B2 * | 8/2018 | Cavallaro | G06F 1/1626 |
| 10,142,547 B2 * | 11/2018 | Yamazaki | G06F 1/1647 |
| 10,175,806 B2 * | 1/2019 | Burr | G06F 1/1652 |
| 10,326,866 B2 * | 6/2019 | Lee | G06F 1/165 |
| 10,403,177 B2 * | 9/2019 | Lim | G09F 9/301 |
| 10,795,416 B2 * | 10/2020 | Schmelzle | E05D 11/0054 |
| 10,847,735 B2 * | 11/2020 | Seo | G09F 13/24 |
| 10,890,949 B2 * | 1/2021 | Ou | G06F 1/1681 |
| 2012/0307423 A1 * | 12/2012 | Bohn | G06F 1/1652 |
| | | | 361/679.01 |
| 2014/0132481 A1 | 5/2014 | Bell et al. | |
| 2015/0338888 A1 * | 11/2015 | Kim | G06F 3/04886 |
| | | | 345/156 |
| 2016/0085319 A1 * | 3/2016 | Kim | G06F 3/0487 |
| | | | 345/156 |
| 2017/0115944 A1 * | 4/2017 | Oh | G06F 3/0482 |
| 2017/0161006 A1 | 6/2017 | Kwon et al. | |
| 2017/0199614 A1 | 7/2017 | Lee et al. | |
| 2017/0287385 A1 * | 10/2017 | Lian | H04M 1/0216 |
| 2018/0004251 A1 * | 1/2018 | Magi | G06F 1/1626 |
| 2018/0368270 A1 * | 12/2018 | Seo | H01L 51/524 |
| 2019/0012000 A1 * | 1/2019 | Cavallaro | G06F 1/1677 |
| 2019/0026008 A1 * | 1/2019 | Yeo | G06F 3/0484 |
| 2019/0075243 A1 * | 3/2019 | Yamazaki | G06F 1/1652 |
| 2019/0086709 A1 * | 3/2019 | Lee | G06F 1/1643 |
| 2019/0306289 A1 * | 10/2019 | Lee | G06F 3/0488 |
| 2020/0105169 A1 * | 4/2020 | Jeong | H01L 51/5253 |

FOREIGN PATENT DOCUMENTS

| | | |
|---|---|---|
| KR | 1020170046977 A | 5/2017 |
| KR | 1020170082722 A | 7/2017 |
| KR | 1020200010697 A | 1/2020 |

\* cited by examiner

ELECTRONIC APPARATUS

CROSS-REFERENCE TO RELATED APPLICATIONS

This application claims priority to Korean Patent Application No. 10-2019-0038060, filed on Apr. 1, 2019, and all the benefits accruing therefrom under 35 U.S.C. § 119, the content of which in its entirety is herein incorporated by reference.

BACKGROUND

Exemplary embodiments of the present disclosure relate to an electronic apparatus, and more particularly, to an electronic apparatus capable of displaying an image on a plurality of surfaces and a driving method thereof.

Various electronic apparatuses used for multimedia apparatuses such as a television, a mobile phone, a tablet computer, a navigation unit, and a game console have been developed.

In recent years, according to market demand, researches for reducing a non-display area, which does not display an image, in the electronic apparatus have been progressed. Simultaneously, researches for increasing a display area, from which an image is seen to a user, in the electronic apparatus have been progressed.

SUMMARY

Exemplary embodiments of the present disclosure provide an electronic apparatus capable of displaying an image on entire surfaces having an approximately rectangular shape.

Exemplary embodiments of the present disclosure also provide an electronic apparatus that displays an image on entire surfaces having a rectangular shape when operates in a first mode and expands an image display area, which is seen to a user, when operates in a second mode.

An exemplary embodiment of the inventive concept provides an electronic apparatus including a display panel including a first surface portion, a second surface portion, and a third surface portion which is disposed between the first surface portion and the second surface portion, where each of the first surface portion, the second surface portion, and the third surface portion displays an image, a window disposed on the display panel, and a housing which provides an exterior of the electronic apparatus in conjunction with the window. Here, the electronic apparatus operates in one of a first mode and a second mode, in the first mode, the third surface portion is bent from the first surface portion, and the second surface portion is bent from the third surface portion, and in the second mode, the first surface portion, the second surface portion, and the third surface portion are substantially parallel to each other.

In an exemplary embodiment, the display panel may further include fourth to sixth surface portions each extending from the first surface portion, and in the first mode and the second mode, the fourth to sixth surface portions may maintain a state bent from the first surface portion.

In an exemplary embodiment, the electronic apparatus may further include a bracket disposed below the display panel to support a portion of the display panel.

In an exemplary embodiment, the bracket may support the first surface portion and the fourth to sixth surface portions and may not support the third surface portion and the second surface portion.

In an exemplary embodiment, the housing may support and contact the second surface portion and the third surface portion.

In an exemplary embodiment, in the first mode, a side surface of the housing and a portion of a rear surface of the housing may be covered by the display panel, and in the second mode, the side surface of the housing and the portion of the rear surface of the housing may be exposed to the outside.

In an exemplary embodiment, an accommodation groove may be defined in a rear surface of the housing, and in the first mode, the second surface portion of the display panel may be accommodated in the accommodation groove.

In an exemplary embodiment, the electronic apparatus may further include a reinforcing portion attached to a lower portion of each of the second surface portion and the third surface portion to support the second surface portion and the third surface portion.

In an exemplary embodiment, the reinforcing portion may have rigidity greater than rigidity of the display panel.

In an exemplary embodiment, the electronic apparatus may further include a holder attached to the housing or the second surface portion, and which fixes the second surface portion to the housing in the first mode.

In an exemplary embodiment, the electronic apparatus may further include a connection port disposed at a side surface of the housing.

In an exemplary embodiment, in the first mode, the connection port may be covered by the third surface portion, and in the second mode, the connection port may be exposed to the outside.

In an exemplary embodiment, the connection port may include a USB port, an earphone port, or a microphone port.

In an exemplary embodiment, the electronic apparatus may further include a hinge fixed to a side surface of the housing, and which supports the third surface portion in the first mode.

In an exemplary embodiment of the inventive concept, an electronic apparatus includes a display panel including a first surface portion, third to sixth surface portions bent and extending from four sides of the first surface portion, respectively, and a second surface portion bent and extending from the third surface portion, wherein each of the first surface portion, the third to sixth surface portions, and the second surface portion displays an image, a window disposed on the display panel, a bracket which supports the display panel, and a housing which provides an exterior of the electronic apparatus in conjunction with the window. Here, the display panel is bent at five places or more.

In an exemplary embodiment, the first surface portion and the second surface portion may face each other and be substantially parallel to each other.

In an exemplary embodiment, the display panel may further include a module hole passing through the second surface portion, and the module hole may be surrounded by an area which displays the image in the second surface portion.

In an exemplary embodiment, the electronic apparatus may further include an electronic module disposed between the first surface portion and the second surface portion, overlapping the module hole in a direction that the module hole passes through the second surface portion, and which receives an external input or provide a signal to the outside through the module hole.

In an exemplary embodiment, the display panel may further include a module hole passing through at least one of the third to sixth surface portions, and the module hole may be surrounded by an area which displays the image in the at least one of the third to sixth surface portions.

In an exemplary embodiment, the electronic apparatus may further include an electronic module disposed below the first surface portion, overlapping the module hole in a direction that the module hole passes through the at least one of the third to sixth surface portions, and which receives an external input or provide a signal to the outside through the module hole.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
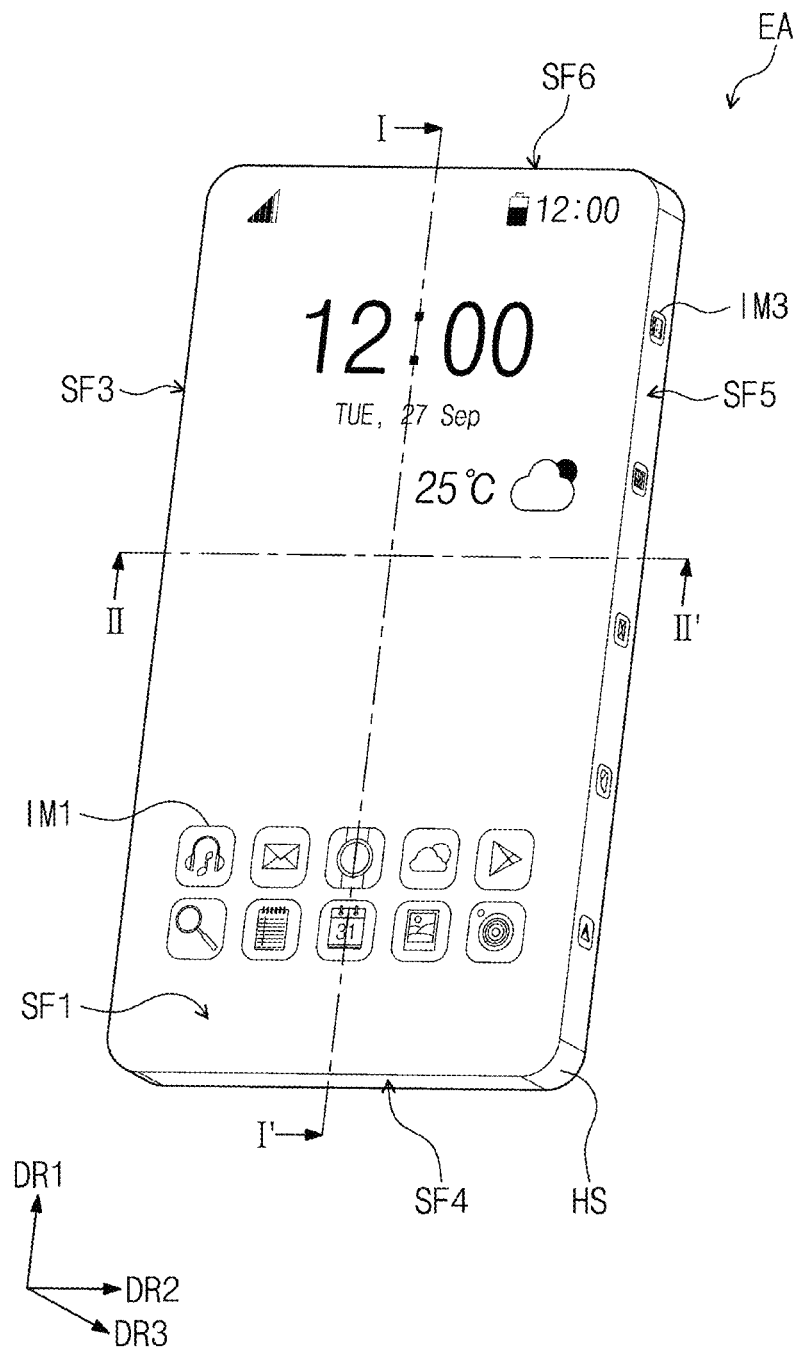
FIG. 1 is a perspective view illustrating an exemplary embodiment of a front surface of an electronic apparatus and a portion of a side surface connected to the front surface according to the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one exemplary embodiment can be referred to as a second element in another exemplary embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, exemplary embodiments of the inventive concept will be described with reference to the accompanying drawings.

Figure 2:
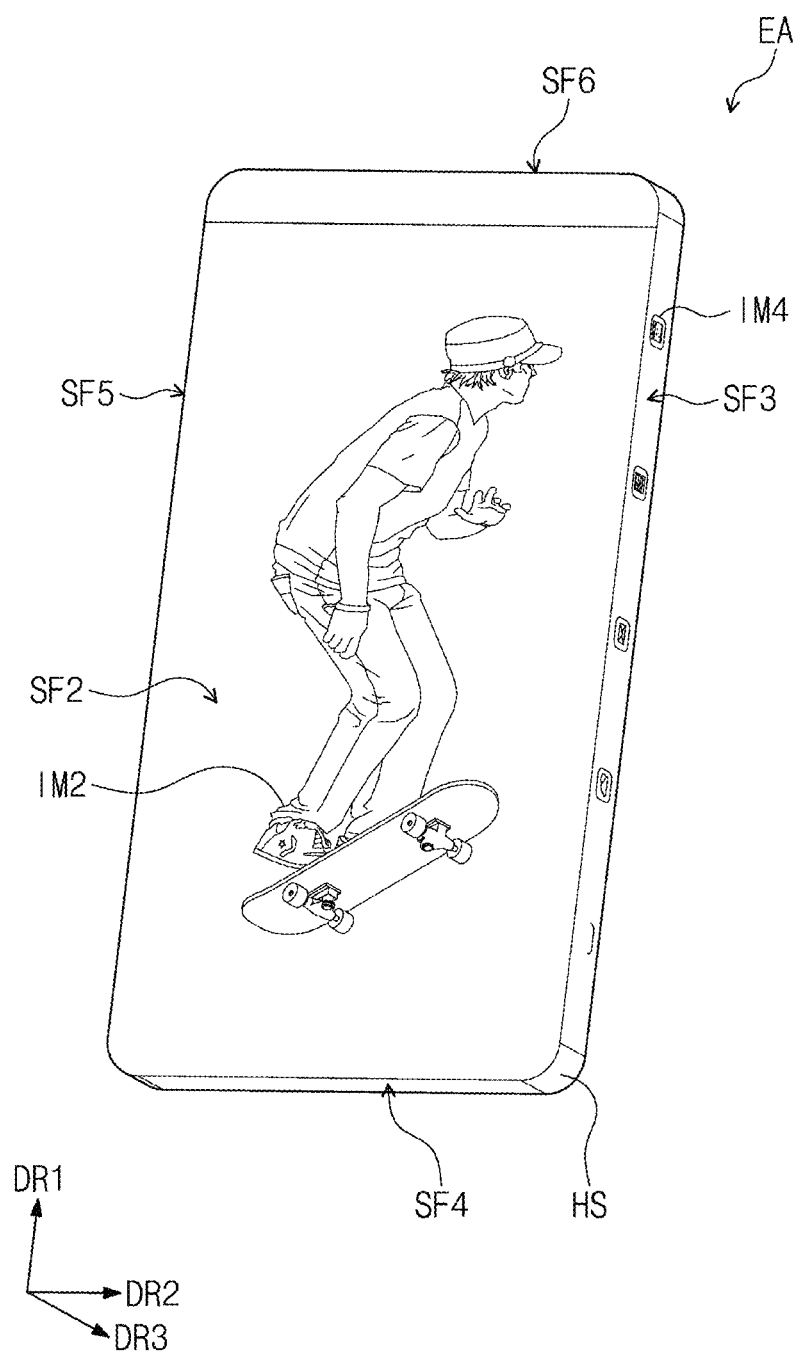
FIG. 2 is a perspective view illustrating an exemplary embodiment of a rear surface of the electronic apparatus and a portion of a side surface connected to the rear surface according to the inventive concept.

FIG. 1 is a perspective view illustrating an exemplary embodiment of a front surface of an electronic apparatus and a portion of a side surface connected to the front surface according to the inventive concept, and FIG. 2 is a perspective view illustrating an exemplary embodiment of a rear surface of the electronic apparatus and a portion of a side surface connected to the rear surface according to the inventive concept.

An electronic apparatus EA may display images IM1 and IM2 on a front surface SF1 and a rear surface SF2, respectively, according to an electrical signal, and detect an external input. In the exemplary embodiment, the image IM1 displayed on the front surface SF1 of the electronic apparatus EA and the image IM2 displayed on the rear surface SF2 of the electronic apparatus EA are illustrated. Also, an image may be displayed on at least a portion of first to fourth side surfaces SF3, SF4, SF5, and SF6. The first to fourth side surfaces SF3, SF4, SF5, and SF6 connect the front surface SF1 and rear surface SF2 of the electronic apparatus EA, respectively. In the exemplary embodiment shown in FIGS. 1 and 2, images IM4 and IM3 are displayed on the first side surface SF3 and the third side surface SF5, respectively.

The external input detected by the electronic apparatus EA may include various types of external inputs such as a portion of a user's body, light, heat, or pressure. Also, the external input may include a direct contact to the electronic apparatus EA or a proximity sensing to the electronic apparatus EA. In the exemplary embodiment, although the electronic apparatus EA is illustrated as a smartphone, the inventive concept is not limited thereto. In another exemplary embodiment, for example, the electronic apparatus EA may include various products having a display, e.g., a television, a monitor, a tablet computer, a game console, or a smartwatch. Also, the external input may be distinguished into a force and a touch.

The front surface SF1 and the rear surface SF2 of the electronic apparatus EA may be parallel to a surface defined by a first direction DR1 and a second direction DR2. A normal direction of the front surface SF1 of the electronic apparatus EA, i.e., a thickness direction of the electronic apparatus EA, may be defined as a third direction DR3. However, directions indicated by the first to third directions DR1, DR2, and DR3 may be relative concepts and thus converted with respect to each other.

Figure 3:
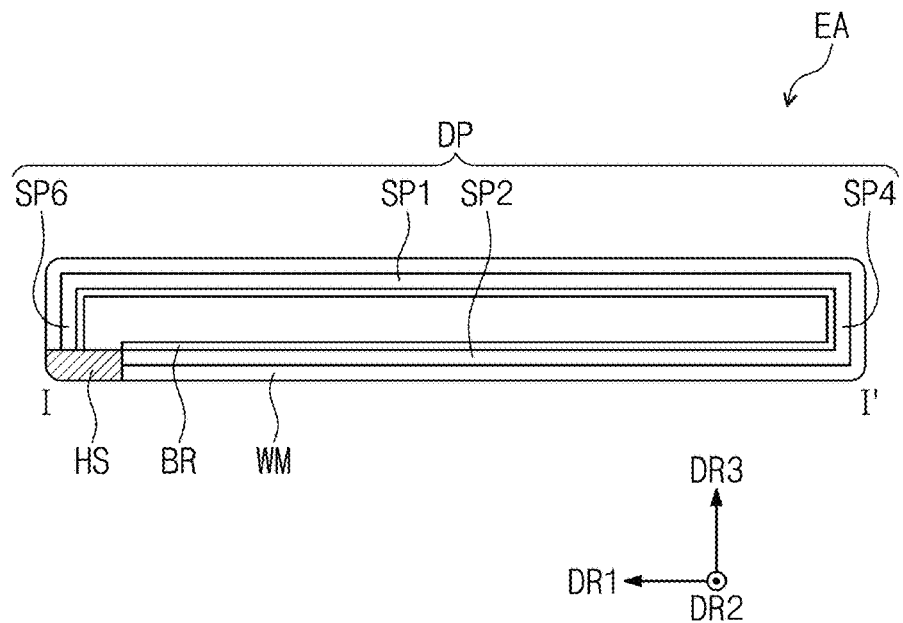
FIG. 3 is a cross-sectional view taken along line I-I' of FIG. 1.
Figure 4:
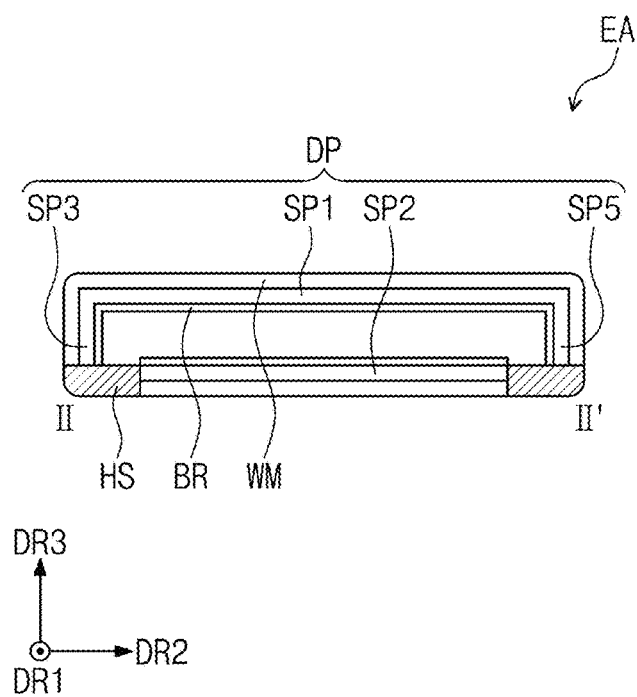
FIG. 4 is a cross-sectional view taken along line II-II' of FIG. 1.

FIG. 3 is a cross-sectional view taken along line I-I' in FIG. 1, and FIG. 4 is a cross-sectional view taken along line II-II' in FIG. 1.

The electronic apparatus EA may include a display panel DP, a window WM, a bracket BR, and a housing HS.

The display panel DP may display an image. The display panel DP may be flexible. In an exemplary embodiment, the display panel DP may be an organic light emitting display panel.

The display panel DP may be bent to overlap the front surface SF1, the rear surface SF2, and the first to fourth side surfaces SF3, SF4, SF5, and SF6 of the electronic apparatus EA, thereby displaying an image.

The window WM is disposed on the display panel DP. The window WM may cover the display panel DP and have a shape similar to that of the display panel DP. The window WM may constitute at least a portion of the front surface SF1, the rear surface SF2, and the first to fourth side surfaces SF3, SF4, SF5, and SF6 of the electronic apparatus EA.

The bracket BR may be disposed below the display panel DP to support the display panel DP as shown in FIGS. 3 and 4. The bracket BR may contain a material having rigidity greater than that of the display panel DP. In this exemplary embodiment, one bracket BR supports an entire area of the display panel DP. However, the inventive concept is not limited thereto. In another exemplary embodiment, for example, the bracket BR may be provided in plural. Also, the bracket BR may support a portion of the display panel DP.

The bracket BR may be bent along a shape of the display panel DP to provide an inner space. In the inner space of the bracket BR, electronic components for operation of the electronic apparatus EA, e.g., a battery, a main printed circuit board, and all sorts of sensors, may be disposed.

The housing HS provides an exterior of the electronic apparatus EA in conjunction with the window WM. In the exemplary embodiment shown in FIGS. 3 and 4, the housing HS constitutes a portion of the rear surface SF2 and portions of the first, third and fourth side surfaces SF3, SF5, and SF6 of the electronic apparatus EA. However, the inventive concept is not limited thereto. For example, in another exemplary embodiment that the display panel DP and the window WM cover an entire area of the exterior of the electronic apparatus EA, the housing HS may be omitted.

In an exemplary embodiment, the bracket BR and the housing HS are spaced apart from each other. However, the inventive concept is not limited thereto. For example, in another exemplary embodiment, the bracket BR and the housing HS may be connected to each other or integrated with each other.

Figure 5:
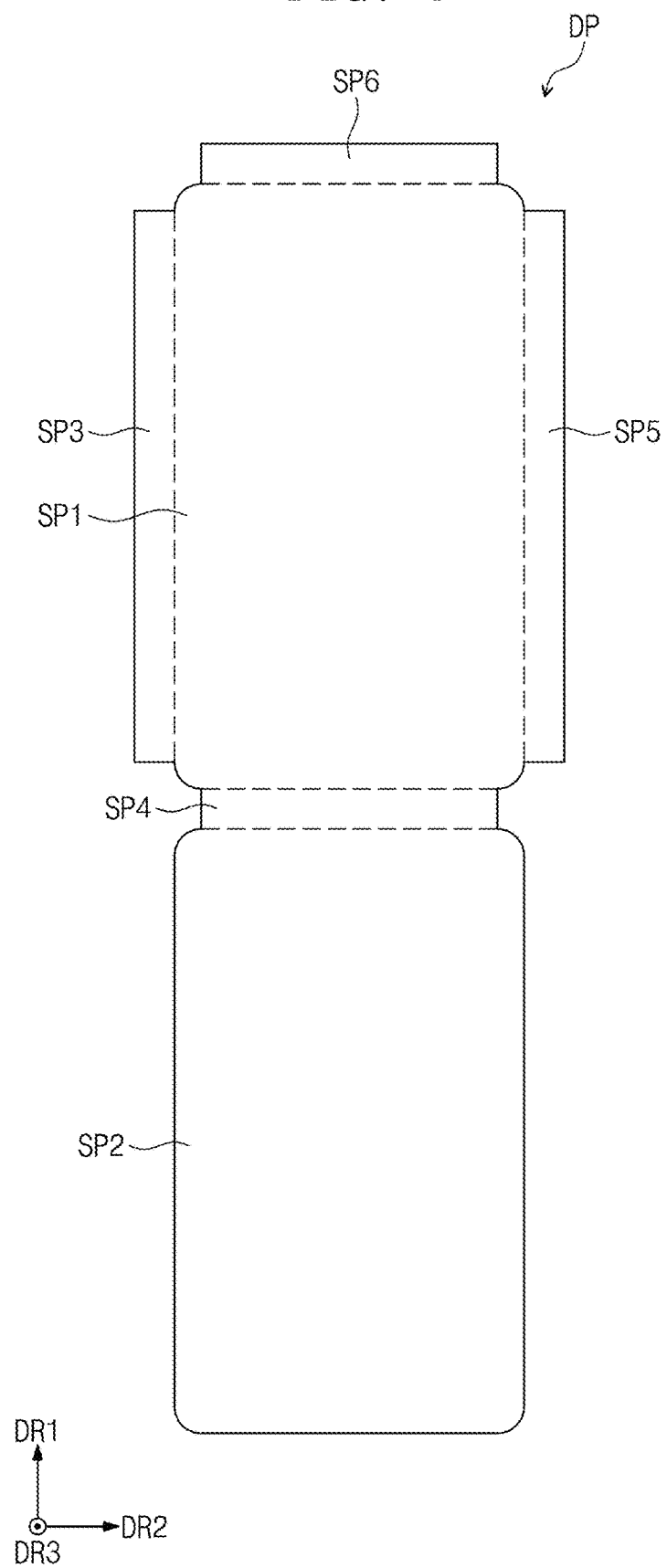
FIG. 5 is a development view illustrating an exemplary embodiment of a display panel according to the inventive concept.

FIG. 5 is a development view illustrating an exemplary embodiment of the display panel according to the inventive concept.

Referring to FIGS. 3 to 5, the display panel DP may include a first surface portion SP1, a second surface portion SP2, and third to sixth surface portions SP3, SP4, SP5, and SP6. The first surface portion SP1 may be referred to as a front surface portion. The second surface portion SP2 may be referred to as a rear surface portion. The third to sixth surface portions SP3, SP4, SP5, and SP6 may be referred to as first to fourth side portions.

Each of the first surface portion SP1, the second surface portion SP2, and the third to sixth surface portions SP3, SP4, SP5, and SP6 may display an image.

The first surface portion SP1 may have a rectangular-like shape, and each of corners of the first surface portion SP1 may have a chamfered structure.

The third surface portion SP3 may extend from a first side of the first surface portion SP1. The sixth surface portion SP4 may extend from a second side of the first surface portion SP1. The first side and the second side of the first surface portion SP1 may be connected to each other. The fifth side surface portion SP5 may extend from a third side of the first surface portion SP1 and face the third surface portion SP3. The first side and the third side of the first surface portion SP1 may face each other. The sixth surface portion SP6 may extend from a fourth side of the first surface portion SP1 and face the sixth surface portion SP4. The second side and the fourth side of the first surface portion SP1 may face each other. The third to sixth surface portions SP3, SP4, SP5, and SP6 may be spaced apart from each other.

The second surface portion SP2 may extend from the sixth surface portion SP4.

The display panel DP is bent with respect to the four sides of the first surface portion SP1. The display panel DP may have a curvature around a boundary between the first surface portion SP1 and the third to sixth surface portions SP3, SP4, SP5, and SP6.

The display panel DP is further bent with respect to a boundary between the second surface portion SP2 and the sixth surface portion SP4. The first surface portion SP1 and the second surface portion SP2 may be spaced apart from each other in the third direction DR3 and face each other when the display panel DP is bent. The first surface portion SP1 and the second surface portion SP2 may be substantially parallel to each other.

In an exemplary embodiment of the inventive concept, the display panel DP may have a structure bent at five places. Thus, as six surfaces for displaying an image are provided, all surfaces of the electronic apparatus EA, which have an approximately rectangular shape, may display an image.

The display apparatus EA may further include a driving element for driving the display panel DP. The driving element may include an integrated circuit chip that applies a signal to signal lines disposed on the display panel DP and a printed circuit board that exchanges driving signals. The integrated circuit chip may be mounted to the printed circuit board. However, the inventive concept is not limited thereto. In another exemplary embodiment, for example, the integrated circuit chip and the printed circuit board may be physically separated and electrically connected.

In an exemplary embodiment, the driving element may be connected to one of the first surface portion SP1, the second surface portion SP2, and the third to sixth surface portions SP3, SP4, SP5, and SP6 of the display panel DP.

Figure 6:
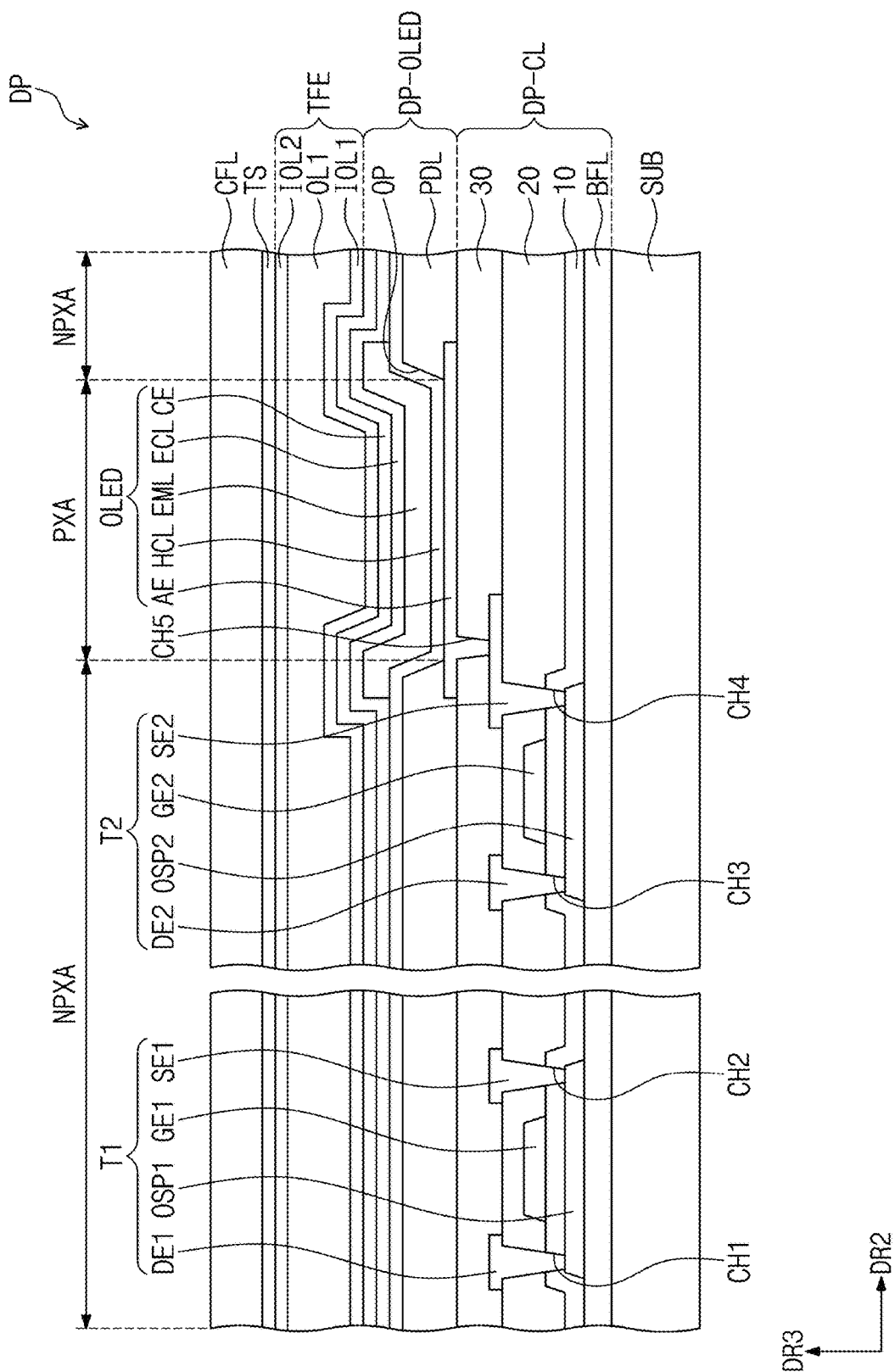
FIG. 6 is a cross-sectional view illustrating a portion of the display panel.

FIG. 6 is a cross-sectional view illustrating a portion of the display panel DP.

The display panel DP may include a base layer SUB, a circuit element layer DP-CL, a display element layer DP-OLED, and an encapsulation layer TFE.

The circuit element layer DP-CL includes transistors. In an exemplary embodiment, a first transistor T1 and a second transistor T2, which are for driving one organic light emitting diode OLED, are exemplarily illustrated.

The circuit element layer DP-CL includes at least one inorganic film, at least one organic film, and a circuit element. The circuit element layer DP-CL may include a buffer layer BFL, a first intermediate inorganic layer 10, and a second intermediate inorganic layer 20, which are inorganic layers, and an intermediate organic layer 30 that is an organic layer.

The inorganic layers may include a silicon nitride, a silicon oxynitride, a silicon oxide, or the like. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. The circuit element includes conductive patterns and/or semiconductor patterns.

The buffer layer BFL improves a coupling force between the base substrate SUB and the conductive patterns or the semiconductor patterns. Although not separately shown, a barrier layer for preventing foreign substances from being introduced may be further disposed on a top surface of the base substrate SUB. The buffer layer BFL and the barrier layer may be selectively disposed or omitted.

On the buffer layer BFL, a semiconductor pattern OSP1 (hereinafter, referred to as a first semiconductor pattern) of the first transistor T1 and a semiconductor pattern OSP2 (hereinafter, referred to as a second semiconductor pattern) of the second transistor T2 are disposed. Each of the first and second semiconductor patterns OSP1 and OSP2 may be selected from amorphous silicon, polysilicon, and a metal oxide semiconductor.

The first intermediate inorganic layer 10 is disposed on the first semiconductor pattern OSP1 and the second semiconductor pattern OSP2. On the first intermediate inorganic layer 10, a control electrode GE1 (hereinafter, referred to as a first control electrode) of the first transistor T1 and a control electrode GE2 (hereinafter, referred to as a second control electrode) of the second transistor T2 are disposed. The first control electrodes GE1 and second control electrodes GE2 may be manufactured by the same photolithography process as scan lines.

The second intermediate inorganic layer 20 for covering the first control electrode GE1 and the second control electrode GE2 is disposed on the first intermediate inorganic layer 10. On the second intermediate inorganic layer 20, an input electrode DE1 (hereinafter, referred to as a first input electrode) and an output electrode SE1 (hereinafter, referred to as a first output electrode) of the first transistor T1 and an input electrode DE2 (hereinafter, referred to as a second input electrode), and an output electrode SE2 (hereinafter, referred to as a second output electrode) of the second transistor T2 are disposed.

The first input electrode DE1 and the first output electrode SE1 are connected to the first semiconductor pattern OSP1 through a first through-hole CH1 and a second through-hole CH2, which pass through the first intermediate inorganic layer 10 and the second intermediate inorganic layer 20, respectively. The second input electrode SE2 and the second output electrode DE2 are connected to the second semiconductor pattern OSP2 through a third through-hole CH3 and a fourth through-hole CH4, which pass through the first intermediate inorganic layer 10 and the second intermediate inorganic layer 20, respectively. According to another exemplary embodiment of the inventive concept, one of the first and second transistors T1 and T2 may have a bottom gate structure.

On the second intermediate inorganic layer 20, the intermediate organic layer 30 for covering the first input electrode DE1, the second input electrode DE2, the first output electrode SE1, and the second output electrode SE2 is disposed. The intermediate organic layer 30 may provide a planar surface.

On the intermediate organic layer 30, the display element layer DP-OLED is disposed. The display element layer DP-OLED may include a pixel defining layer PDL and an organic light emitting diode OLED. The pixel defining layer PDL may include an organic material, like the intermediate organic layer 30. On the intermediate organic layer 30, a first electrode AE is disposed. The first electrode AE is connected to the second output electrode SE2 through a fifth contact hole CH5 passing through the intermediate organic layer 30. An opening OP is defined in the pixel defining layer PDL. The opening OP of the pixel defining layer PDL exposes at least a portion of the first electrode AE.

On the display panel DP, a light emitting area PXA and a non-light emitting area NPXA may be defined. The non-light emitting area NPXA may surround the light emitting area PXA. In an exemplary embodiment, the light emitting area PXA may be defined in correspondence to a partial area of the first electrode AE. Here, the partial area is an exposed area of the first electrode AE by the opening OP. The light emitting area PXA is an area through which light emitted from the organic light emitting diode OLED is emitted to the outside, and the light emitted from the organic light emitting diode OLED is blocked by the non-light emitting area NPXA. Although not shown, the non-light emitting area NPXA may be defined between a plurality of light emitting areas PXA. Also, although the non-light emitting area NPXA is a monolithic area as a whole, the non-light emitting area NPXA is described as a plurality of areas to specify a partial area of the non-light emitting area NPXA in following exemplary embodiments.

A hole control layer HCL may be disposed in common on the light emitting area PXA and the non-light emitting area NPXA. Although not separately shown, a common layer such as the hole control layer HCL may be provided on the entire base layer SUB.

On the hole control layer HCL, a light emitting layer EML is disposed. The light emitting layer EML may be disposed on an area corresponding to the opening OP. That is, the light emitting layer EML may be divided and provided on each of the plurality of light emitting areas PXA. The light emitting layer EML may contain an organic material and/or an inorganic material. In the exemplary embodiment, the patterned light emitting layer EML is exemplarily illustrated. However, the inventive concept is not limited thereto. In another exemplary embodiment, for example, the light emitting layer EML may be disposed in common on the plurality of light emitting areas PXA. Here, the light emitting layer EML may generate red, green, blue, or white light. However, the inventive concept is not limited to the generated color of light. Also, the light emitting layer EML may have a multilayer structure.

On the light emitting layer EML, an electron control layer ECL is disposed. Although not separately shown, the electron control layer ECL may be provided in common on the plurality of light emitting areas PXA.

On the electron control layer ECL, a second electrode CE is disposed. The second electrode CE is disposed in common on the plurality of light emitting areas PXA.

On the second electrode CE, an encapsulation layer TFE is disposed. The encapsulation layer TFE is disposed in common on the plurality of light emitting areas PXA. In the exemplary embodiment, the encapsulation layer TFE directly covers the second electrode CE.

The encapsulation layer TFE may include at least one encapsulation inorganic film and at least one encapsulation organic film. The encapsulation inorganic film and the encapsulation organic film may be alternately laminated with each other.

In an exemplary embodiment of the inventive concept, the encapsulation layer TFE includes first and second encapsulation inorganic films IOL1 and IOL2 and a first encapsulation organic film OL1.

The first encapsulation inorganic film IOL1, the first encapsulation organic film OL1, and the second encapsulation inorganic film IOL2 may be sequentially laminated on the second electrode CE.

The first encapsulation inorganic film IOL1 may be provided by using an inkjet printing method or by applying a composition containing an acrylic-based monomer. The first and second encapsulation inorganic film IOL1 and IOL2 may contain the same inorganic material as each other or different inorganic materials from each other. However, the inventive concept is not particularly limited to the material of the first and second encapsulation inorganic film IOL1 and IOL2. In another exemplary embodiment, for example, each of the first and second encapsulation inorganic film IOL1 and IOL2 may include a silicon nitride, a silicon oxynitride, and a silicon oxide.

In another exemplary embodiment of the inventive concept, a capping layer for covering the second electrode CE may be further disposed between the encapsulation layer TFE and the second electrode CE. Here, the encapsulation layer TFE may directly cover the capping layer.

The display panel DP may further include a touch sensing unit TS and an anti-reflection layer CFL.

The touch sensing unit TS acquires coordinate information of an external input. The touch sensing unit TS may be directly disposed on the organic light emitting encapsulation layer TFE. In this specification, an expression of "directly disposed" represents a feature of two layers directly attached to each other by a continuously-forming process, not a feature of two layers attached to each other by using a separate adhesive layer therebetween. However, the inventive concept is not limited thereto. In another exemplary embodiment, for example, the touch sensing unit TS may be attached on the encapsulation layer TFE by using an adhesive layer therebetween.

The anti-reflection layer CFL may be disposed on the touch sensing unit TS. The anti-reflection layer CFL prevents the inside of the display panel DP from being seen to a user as external light is reflected by the inside of the display panel DP. The anti-reflection layer CFL may be realized as a laminate of optical films such as a polarizing film and a ¼ wavelength film for preventing reflection of external light. In another exemplary embodiment, the anti-reflection layer CFL may include a color filter and a black matrix.

FIGS. 7A to 7E are development views illustrating exemplary embodiments of display panels according to the inventive concept.

Display panels DP1 to DP5 described with reference to FIGS. 7A to 7E are substantially the same as the display panel DP described with reference to FIG. 5 except for a second surface portion.

Figure 7A:
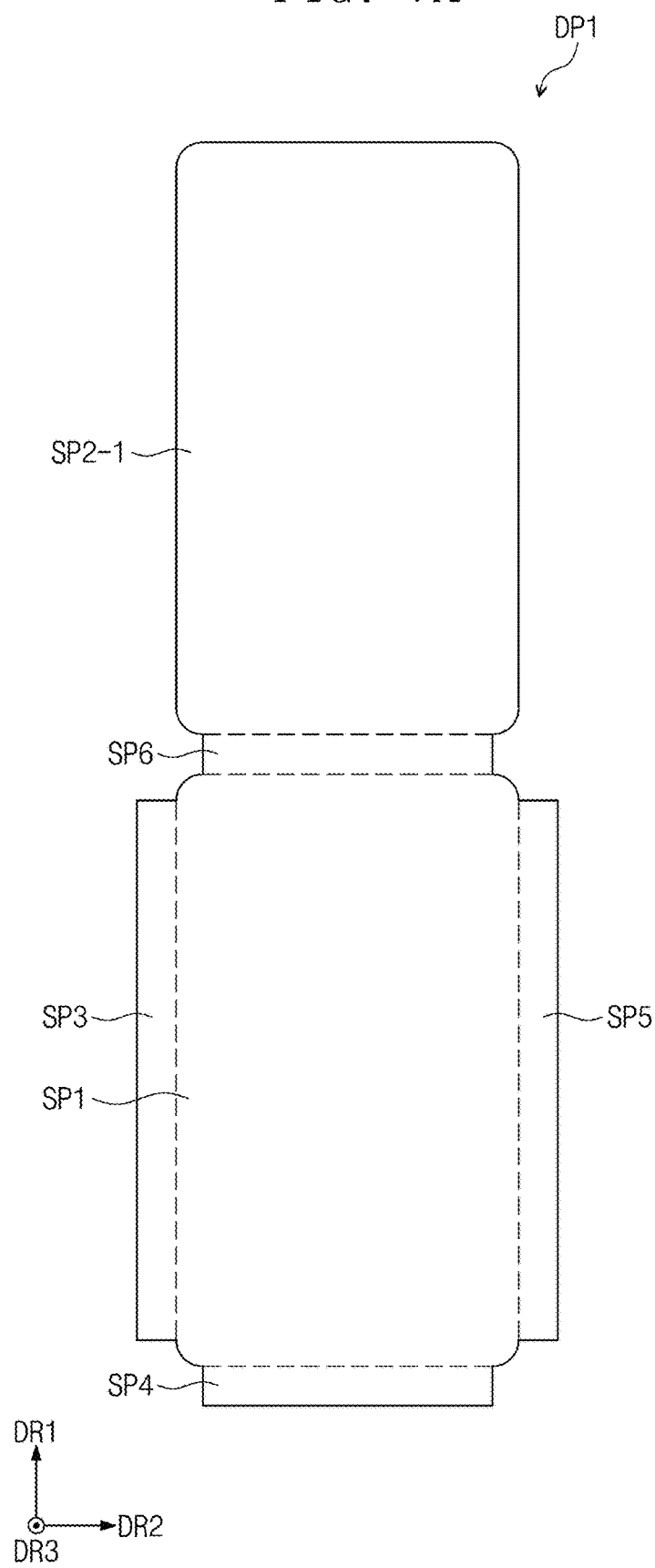
FIGS. 7A to 7E are development views illustrating exemplary embodiments of display panels according to the inventive concept.

Referring to FIG. 7A, a second surface portion SP2-1 of a display panel DP1 may extend from a sixth surface portion SP6 and be bent.

Figure 7B:
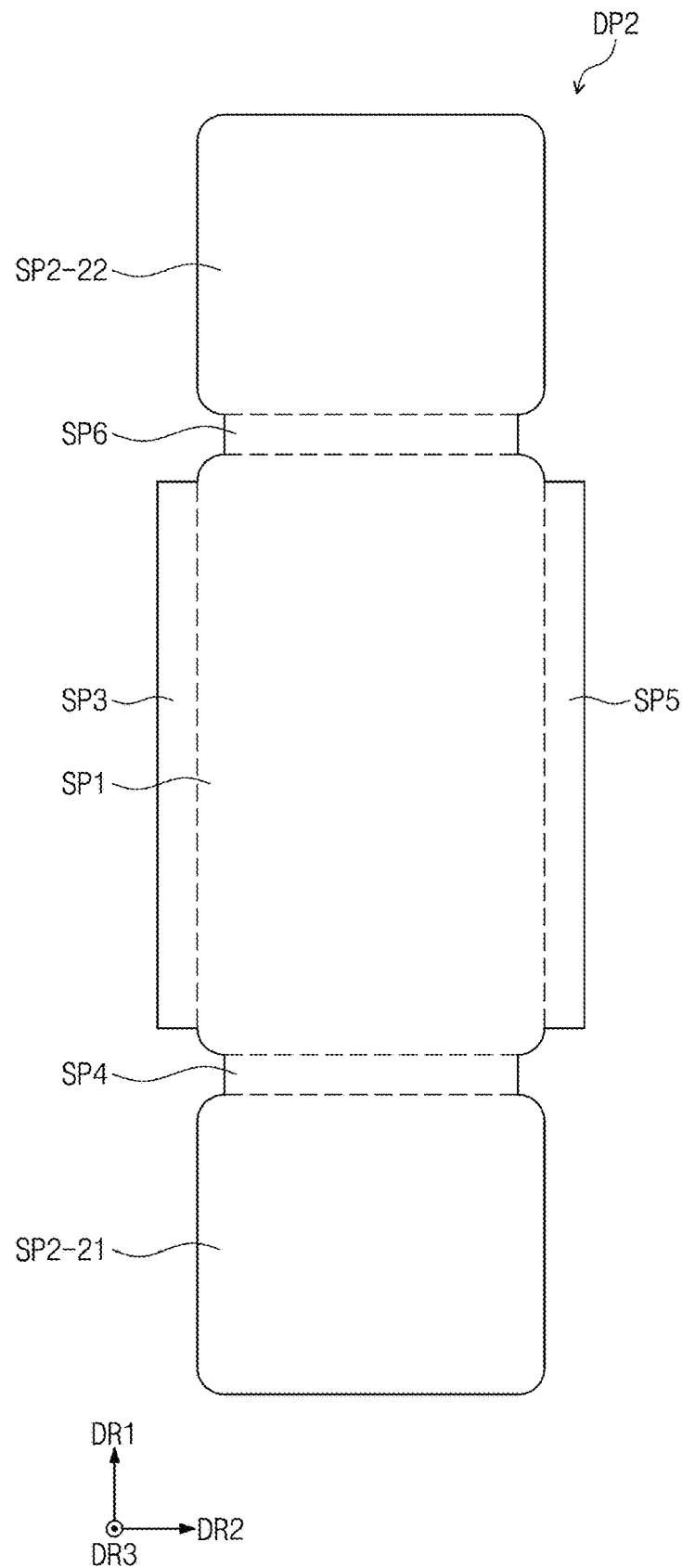

Referring to FIG. 7B, a second surface portion of a display panel DP2 may include a first second surface portion SP2-21 and a second second surface portion SP2-22. The first second surface portion SP2-21 may extend from a sixth surface portion SP4 and be bent. The second second surface portion SP2-22 may extend from a sixth surface portion SP6 and be bent.

Figure 7C:
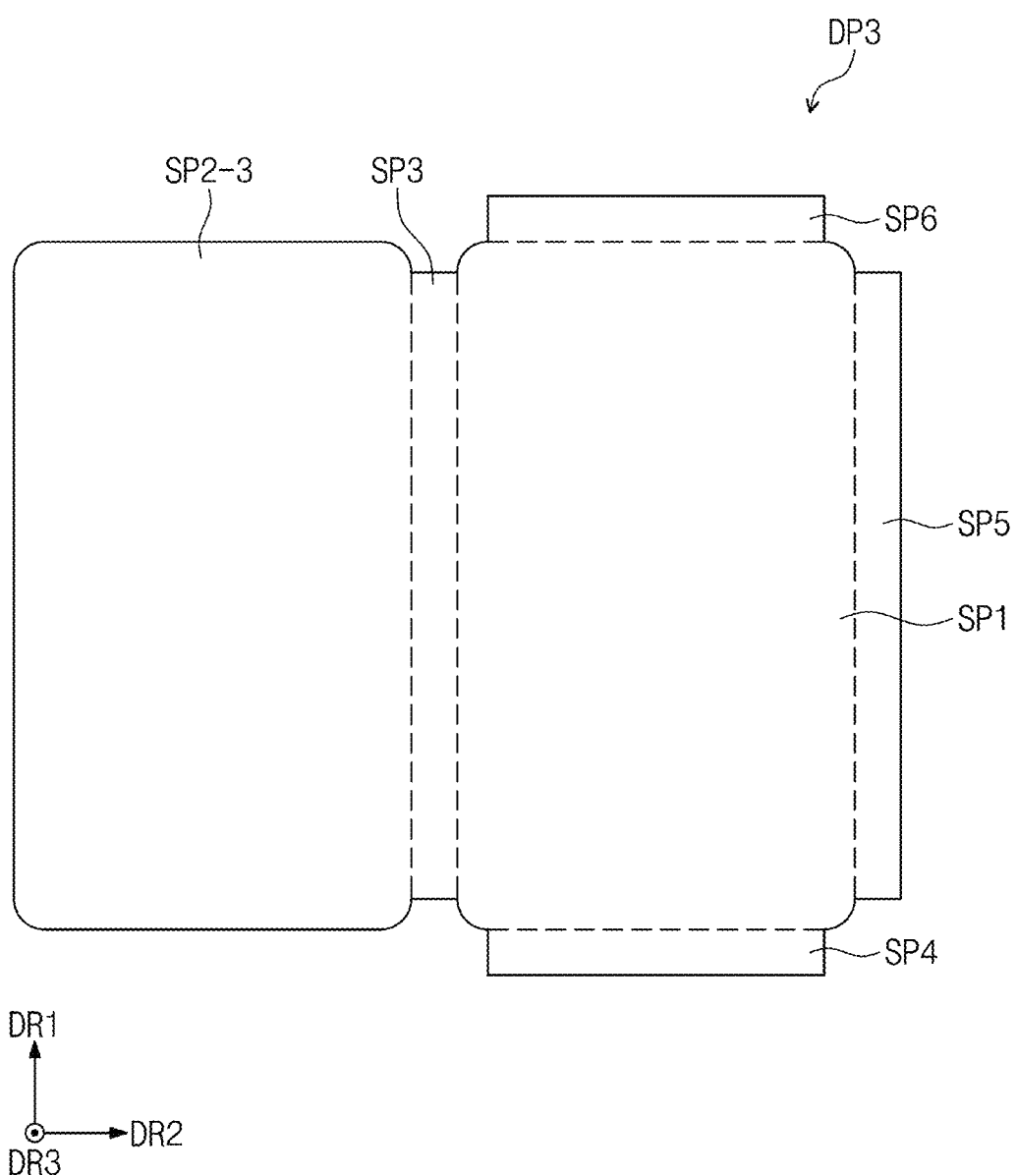
Figure 7D:
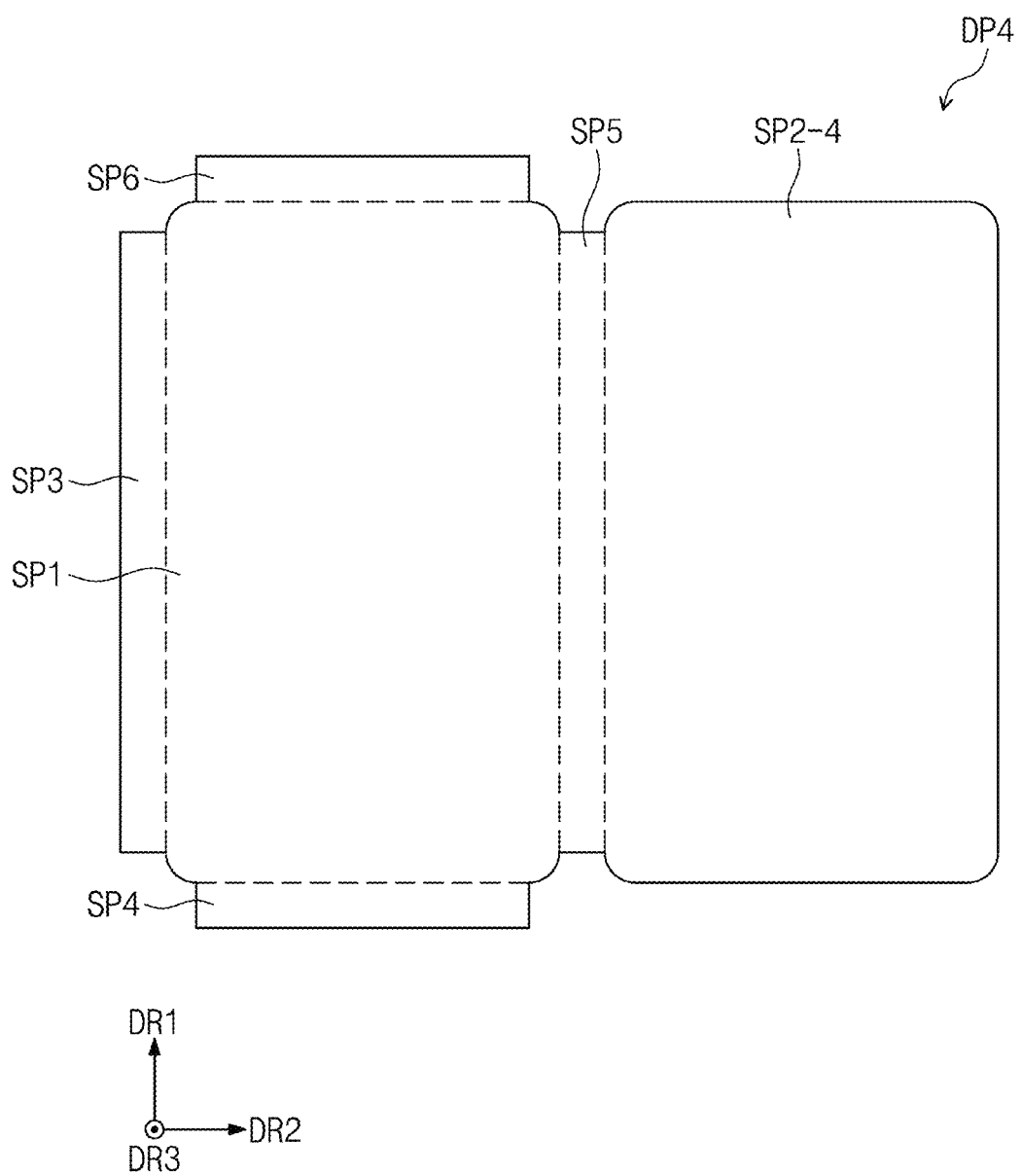
Figure 7E:
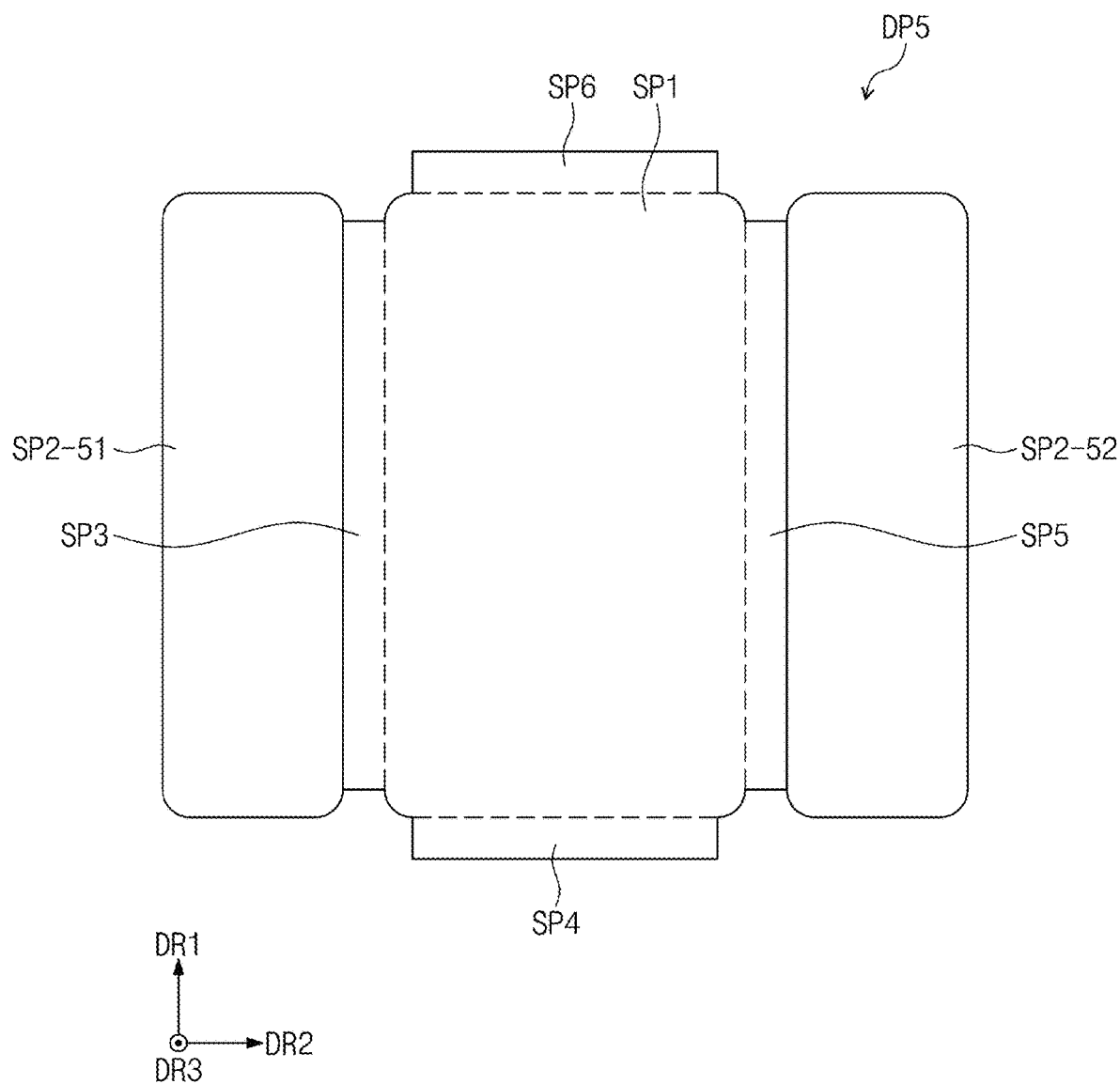

Referring to FIG. 7C, a second surface portion SP2-3 of a display panel DP3 may extend from a third surface portion SP3 and be bent. Referring to FIG. 7D, a second surface portion SP2-4 of a display panel DP4 may extend from a fifth side surface portion SP5 and be bent. Referring to FIG. 7E, a second surface portion of a display panel DP5 may include a first second surface portion SP2-51 and a second second surface portion SP2-52 and be bent. The first second surface portion SP2-51 may extend from a third surface portion SP3 and be bent. The second second surface portion SP2-52 may extend from a fifth side surface portion SP5 and be bent.

Each of the display panels DP2 and DP5 described with reference to FIGS. 7B and 7E may have a structure bent at six places.

Figure 8:
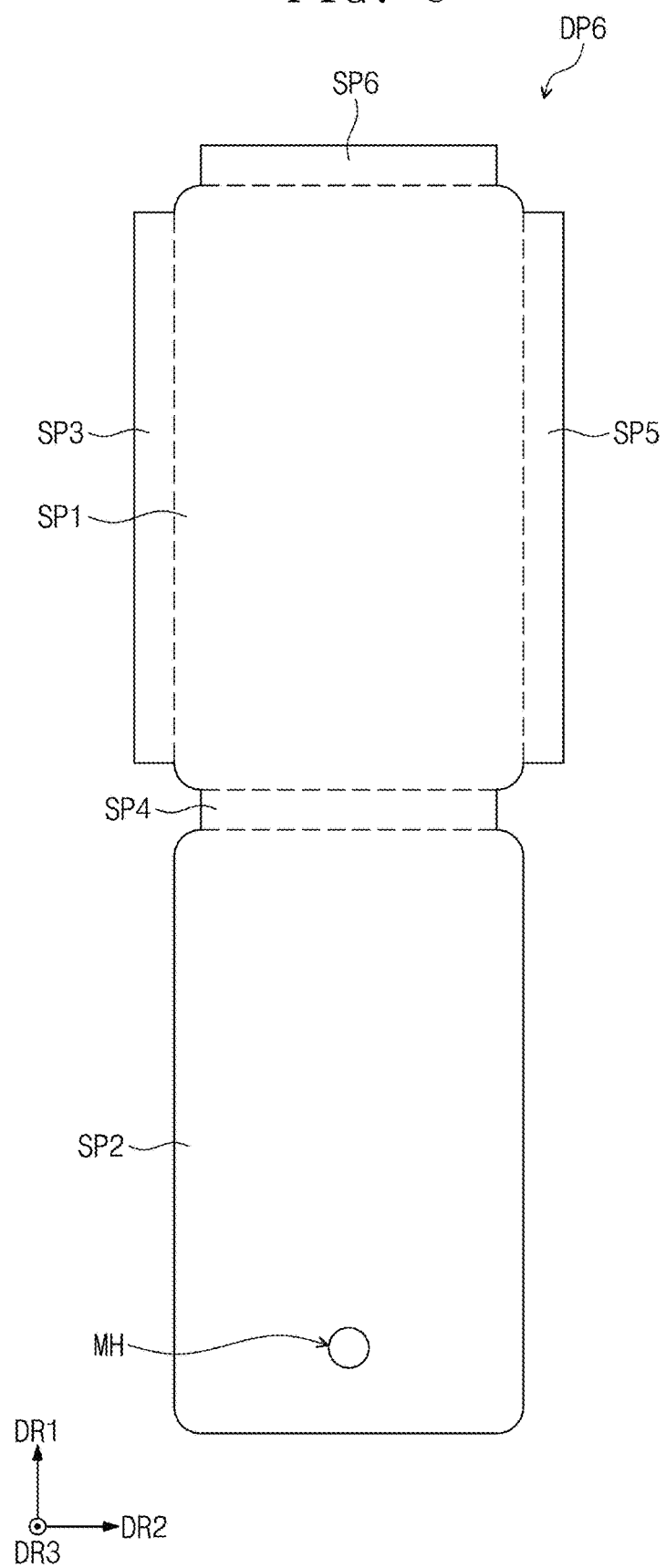
FIG. 8 is a development view illustrating another exemplary embodiment of a display panel according to the inventive concept.

FIG. 8 is a development view illustrating another exemplary embodiment of a display panel according to the inventive concept.

Referring to FIG. 8, a display panel DP6 may further include a module hole MH in comparison with the display panel DP described with reference to FIG. 5.

The module hole MH is a hole passing through a second surface portion SP2. The module hole MH may be surrounded by an area, which displays an image, of the second surface portion SP2.

The electronic apparatus EA (refer to FIG. 1) according to an exemplary embodiment of the inventive concept may further include an electronic module (not shown) disposed between the first surface portion SP1 and the second surface portion SP2 of the display panel DP and overlapping the module hole MH in a direction that the module hole MH passes through the second surface portion SP2 (i.e., the third direction DR3). The electronic module may receive an external input or provide a single to the outside through the module hole HM. For example, the electronic module may include a camera, a speaker, or a detection sensor for detecting light or heat. The electronic module may detect an external subject received through the module hole MH or provide a sound signal such as voice to the outside through the module hole MH.

In the exemplary embodiment, although one module hole MH is exemplary exemplarily provided, the inventive concept is not limited thereto. In another exemplary embodiment, for example, the module hole MH may be provided in plural. Also, although the module hole MH passes through the second surface portion SP2 in the exemplary embodiment, in another exemplary embodiment, the module hole may pass through the first surface portion SP1, or a plurality of module holes may pass through the first surface portion SP1 and the second surface portion SP2, respectively.

Figure 9:
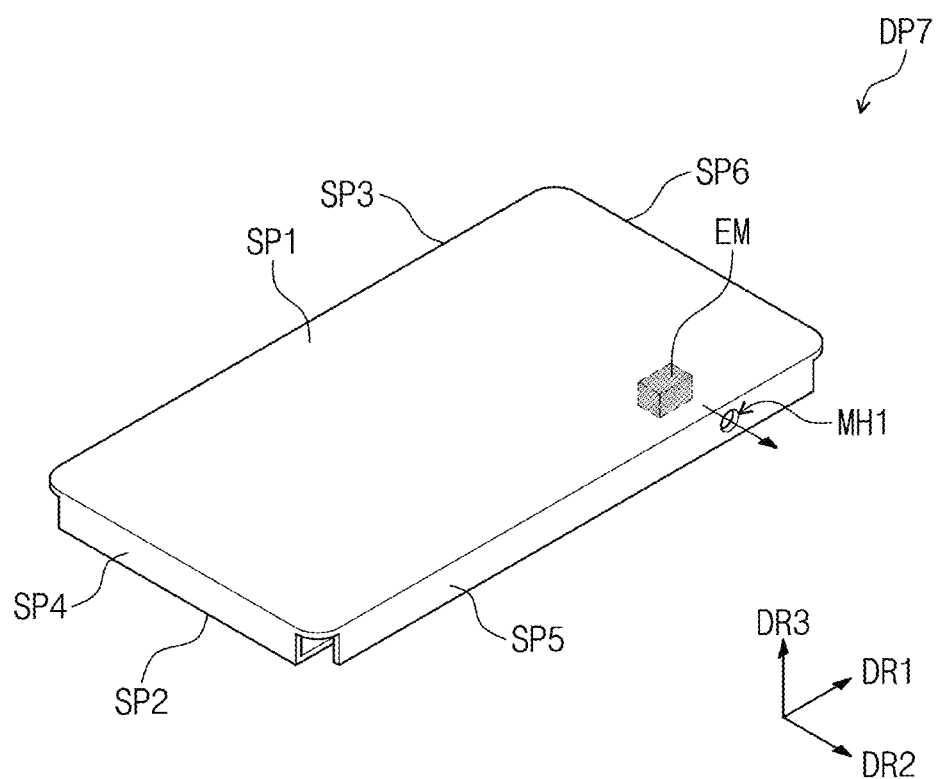
FIG. 9 is a perspective view illustrating another exemplary embodiment of an electronic module and a display panel in a bent state according to the inventive concept.

FIG. 9 is a perspective view illustrating another exemplary embodiment of an electronic module and a display panel in a bent state according to the inventive concept.

A display panel DP7 in FIG. 9 is different from the display panel DP6 described with reference to FIG. 8 in that a module hole MH1 is provided on at least one of third to sixth surface portions SP3, SP4, SP5, and SP6.

In FIG. 9, the module hole MH1 is exemplarily provided to the fifth side surface portion SP5. The module hole MH1 may be surrounded by an area, which displays an image, of the fifth side surface portion SP5.

The electronic apparatus EA (refer to FIG. 1) including the display panel DP7 in FIG. 9 may further include an electronic module EM. The electronic module EM may be disposed below the first surface portion SP1 and overlap the module hole MH1 in a direction that the module hole MH1 passes through the fifth side surface portion SP5 (i.e., the second direction DR2). Since the electronic module EM is substantially similar to the electronic module described with reference to FIG. 8, detailed description regarding the electronic module EM will be omitted.

In the exemplary embodiment, since the module hole MH1 is defined in the third to sixth surface portions SP3, SP4, SP5, and SP6, the electronic module EM may receive an external input or provide a signal to the outside through the module hole MH1 in a direction parallel to the plane defined by the first direction DR1 and the second direction DR2.

According to an exemplary embodiment of the inventive concept, as the module hole MH1 is defined in the third to sixth surface portions SP3, SP4, SP5, and SP6, and the electronic module EM corresponding to the module hole MH1 is provided in the display panel DP7, the electronic module EM may receive an external input or provide a signal to the outside in a direction parallel to the first surface portion SP1 of the display panel DP7. Thus, a sensing angle, a sensing range, and a signal transmission range of the electronic module EM may be expanded.

Figure 10:
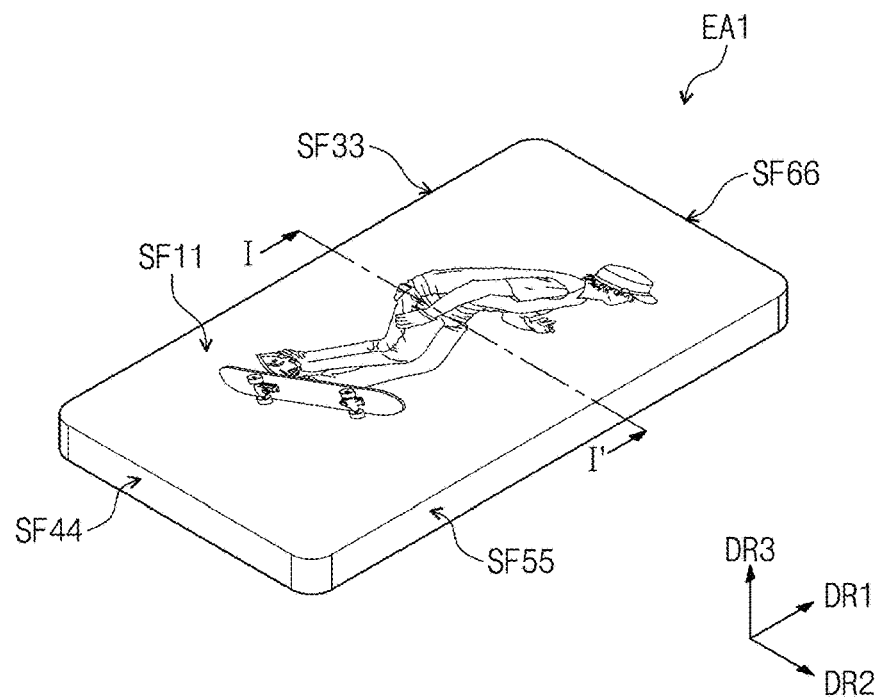
FIG. 10 is a perspective view illustrating another exemplary embodiment of an electronic apparatus operating in a first mode according to the inventive concept.
Figure 11:
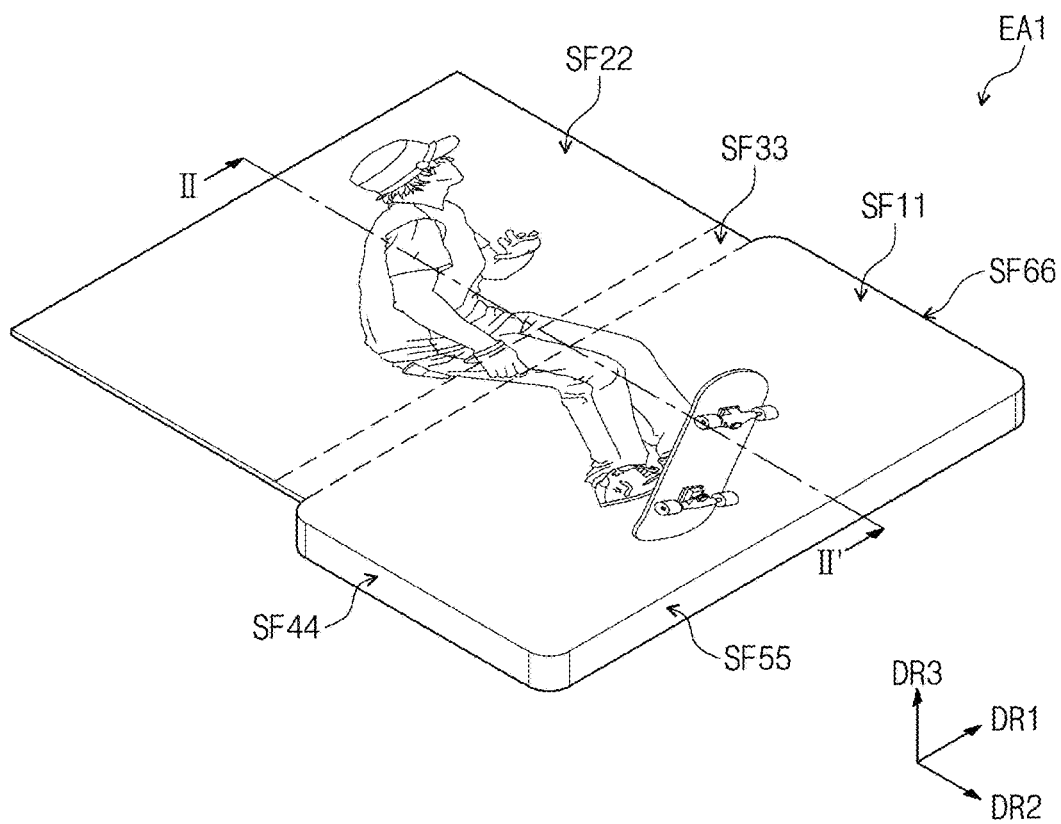
FIG. 11 is a perspective view illustrating another exemplary embodiment of the electronic apparatus operating in a second mode according to the inventive concept.

FIG. 10 is a perspective view illustrating another exemplary embodiment of an electronic apparatus operating in a first mode according to the inventive concept, and FIG. 11 is a perspective view illustrating another exemplary embodiment of the electronic apparatus operating in a second mode according to the inventive concept.

Referring to FIGS. 10 and 11, an electronic apparatus EA1 may operate in one of the first mode and the second mode.

The electronic apparatus EA1 operating in the first mode may have a substantially similar structure in terms of an exterior to the electronic apparatus EA described with reference to FIGS. 1 and 2.

The electronic apparatus EA1 operating in the first mode may display an image on a front surface SF11 and a rear surface SF22. Also, the electronic apparatus EA1 may display an image on at least a portion of first to fourth side surfaces SF33, SF44, SF55, and SF66 connecting the front surface SF11 to the rear surface SF22.

When the electronic apparatus EA1 operates in the first mode, the front surface SF11 and the rear surface SF22 may face each other in the third direction DR3, the first side surface SF33 and the third side surface SF55 may face each other in the second direction DR2, and the second side surface SF44 and the fourth side surface SF66 may face each other in the first direction DR1.

The electronic apparatus EA1 may change an operation state from the first mode to the second mode. A user may apply a physical force to the electronic apparatus EA1 to change the operation state of the electronic apparatus EA1 from the first mode to the second mode. However, the inventive concept is not limited thereto. In another exemplary embodiment, for example, the electronic apparatus EA1 may further include a mode converting module for delivering a physical force to a component of the rear surface SF22 to provide an electrical signal to the mode converting module, thereby converting the mode.

In the second mode, as the rear surface SF22 of the electronic apparatus EA1 is unfolded with respect to the front surface SF21, the front surface SF11 and the rear surface SF22 of the electronic apparatus EA1 may be disposed on substantially the same plane. Also, the first side surface SF33, disposed between the front surface SF11 and the rear surface SF22 to connect the front surface SF11 and the rear surface SF22, is also disposed on the same plane as the front surface SF11 and the rear surface SF22.

In an exemplary embodiment of the inventive concept, the first side surface SF33 may be a side surface having an approximately rectangular shape on a plane and connected to a long side of the electronic apparatus EA1.

When the electronic apparatus EA1 operates in the second mode, an image display area, which is seen to a user looking the front surface of the electronic apparatus EA1, may be expanded in comparison with a case when operates in the first mode.

Figure 12:
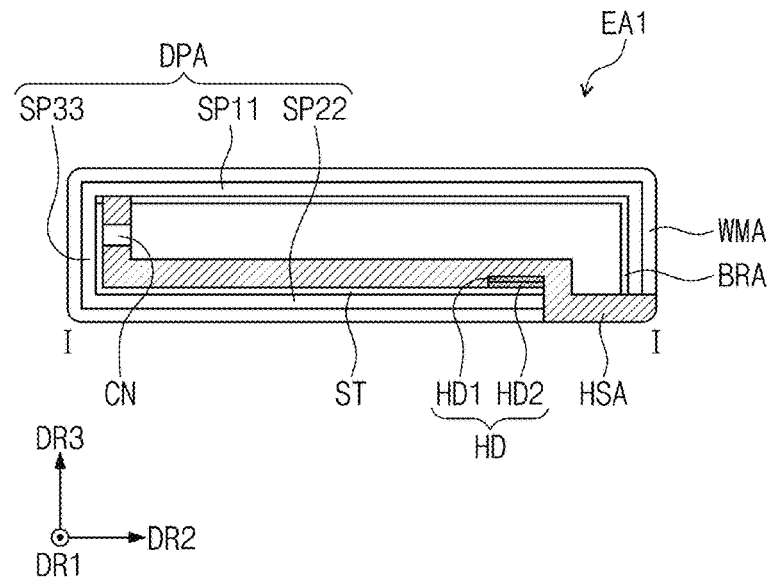
FIG. 12 is a cross-sectional view taken along line I-I' of FIG. 10.
Figure 13:
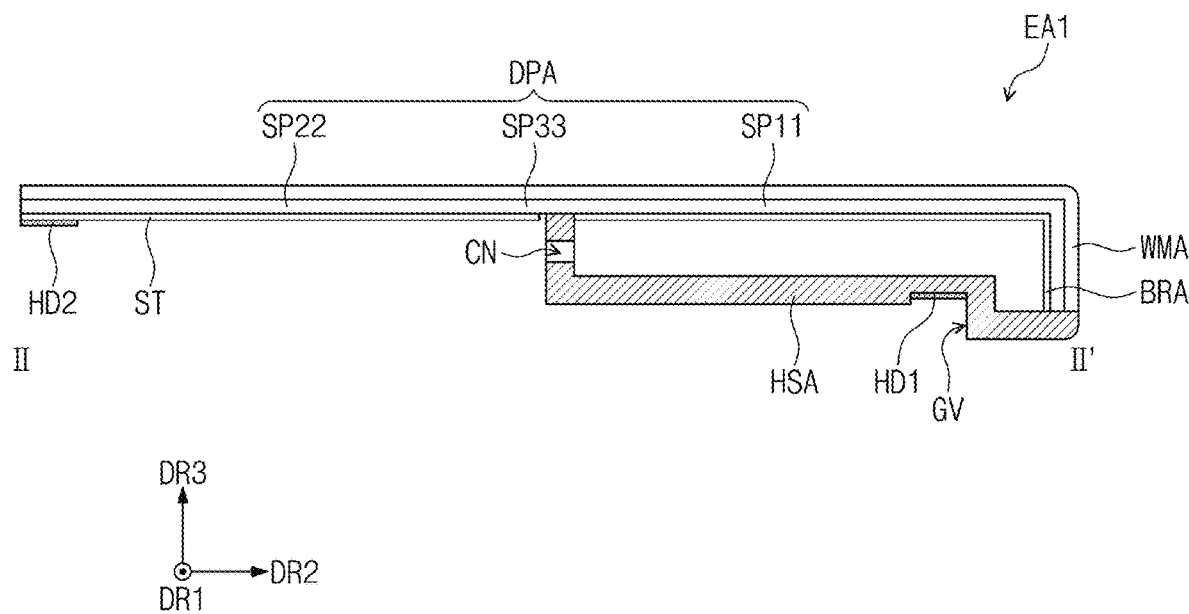
FIG. 13 is a cross-sectional view taken along line II-II' of FIG. 11.

FIG. 12 is a cross-sectional view taken along line I-I' of FIG. 10, and FIG. 13 is a cross-sectional view taken along line II-II' of FIG. 11.

Referring to FIGS. 10 to 13, the electronic apparatus EA1 may include a display panel DPA, a window WMA, a bracket BRA, and a housing HSA.

The display panel DPA may display an image. The display panel DPA may be flexible. In the exemplary embodiment, the display panel DPA may be an organic light emitting display panel.

The display panel DPA may be bent to overlap the front surface SF11, the rear surface SF22, and the first to fourth side surfaces SF33, SF44, SF55, and SF66, thereby displaying an image.

The window WMA may be disposed on the display panel DPA. The window WMA may cover the display panel DPA and have a similar shape to the display panel DPA. The window WMA may constitute at least a portion of the front surface SF11, the rear surface SF22, and the first to fourth side surfaces SF33, SF44, SF55, and SF66.

The display panel DPA may include a first surface portion SP11, a second surface portion SP22, and third to sixth surface portions, which overlap the front surface SF11, the rear surface SF22, and the first to fourth side surfaces SF33, SF44, SF55, and SF66 of the electronic apparatus EA1, respectively. The third to sixth surface portions may be spaced apart from each other. In FIGS. 12 and 13, the third surface portion SP33 of the third to sixth surface portions is illustrated.

The window WMA and the display panel DPA may be attached to each other. Hereinafter, shape conversion of the display panel DPA when the operation mode of the electronic apparatus EA1 changes from the first mode to the second mode will be described, and the window WMA may be converted in shape in conjunction with the display panel DPA.

When the electronic apparatus EA1 operates in the first mode, the third surface portion SP33 of the display panel DPA may be bent from the first surface portion SP11, and the second surface portion SP22 may be bent from the third surface portion SP33. Thus, the first surface portion SP11 and the second surface portion SP22 may be spaced apart from each other and face each other in the third direction DR3 as shown in FIG. 12.

When the electronic apparatus EA1 operates in the second mode, the second surface portion SP22 may be disposed in substantially parallel to the third surface portion SP33, and the third surface portion SP33 may be disposed in substantially parallel to the first surface portion SP11 as shown in FIG. 13.

The bracket BRA may be disposed below the display panel DPA to support a portion of the display panel DPA. The bracket BRA may support the first surface portion SP11 and the fourth to sixth surface portions of the display panel DPA. Since relative positions of the second surface portion SP22 and the third surface portion SP33 of the display panel DPA with respect to the first surface portion SP11 change according to mode conversion of the electronic apparatus EA1, the bracket BRA may not support the second surface portion SP22 and the third surface portion SP33 of the display panel DPA.

The housing HSA may support and contact the second surface portion SP22 and the third surface portion SP33 of the display panel DPA in the first mode.

When the electronic apparatus EA1 operates in the first mode, a side surface of the housing HSA and a portion of a rear surface of the housing HSA are covered by the display panel DP. An accommodation groove GV capable of accommodating the second surface portion SP22 of the display panel DPA may be defined in a rear surface of the housing HSA as shown in FIG. 13. When the electronic apparatus EA1 operates in the first mode, since the second surface portion SP22 of the display panel DPA may be accommodated in the accommodation groove GV, a stepped portion by the accommodation groove GV may not be visible at a lower portion of the electronic apparatus EA1 from the outside.

When the electronic apparatus EA1 operates in the first mode, the side surface and the accommodation groove GV of the housing HSA may be covered by the display panel DPA. When the electronic apparatus EA1 operates in the second mode, the side surface of the housing HSA and the portion of the rear surface of the housing HSA are exposed to the outside. For example, when the electronic apparatus EA1 operates in the second mode, the side surface and the accommodation groove GV of the housing HSA may be exposed to the outside.

The electronic apparatus EA1 may further include a reinforcing portion ST and a holder HD.

The reinforcing portion ST may support a portion of the display panel DPA. The reinforcing portion ST may be attached to a lower portion of each of the second surface portion SP22 and the third surface portion SP33 to support the second surface portion SP22 and the third surface portion SP33. The reinforcing portion ST may be bent or unfolded in conjunction with the second surface portion SP22 and the third surface portion SP33 as the electronic apparatus EA1 operates in the first mode or the second mode. Since the reinforcing portion ST has rigidity greater than that of the display panel DPA, the reinforcing portion ST may support the second surface portion SP22 and the third surface portion SP33 when the electronic apparatus EA1 operates in the first mode and the second mode.

The holder HD serves to fix the second surface portion SP22 of the display panel DPA to the housing HSA when the electronic apparatus EA1 operates in the first mode. The holder HD may include a first holder HD1 attached to the housing HSA and a second holder HD2 attached to the display panel DPA. The first holder HD1 and the second holder HD2 may be components having coupling forces with each other, e.g., magnetic bodies. In another exemplary embodiment of the inventive concept, one of the first holder HD1 and the second holder HD2 may be omitted. For example, in a case that the reinforcing portion ST is made of metal, and the first holder HD1 is a magnetic body, the second holder HD2 may be omitted.

The electronic apparatus EA1 may further include a connection port CN disposed at the side surface of the housing HSA. The connection port CN may overlap the second surface portion SP22 and/or the third surface portion SP33 of the display panel DPA. In the exemplary embodiment, the connection port CN exemplarily overlaps the third surface portion SP33 of the display panel DPA in the second direction DR2 in the first mode.

When the electronic apparatus EA1 operates in the first mode, the connection port CN may be covered by the third surface portion SP33 and thus may not be exposed to the outside. When the electronic apparatus EA1 operates in the second mode, the connection port CN may be exposed to the outside.

The connection port CN may include a USB port, an earphone port, or a microphone port.

According to an exemplary embodiment of the inventive concept, when the electronic apparatus EA1 operates in the first mode, an image may be displayed on the six surfaces of the electronic apparatus EA1 without exposing the connection port CN, and when the electronic apparatus EA1 operates in the second mode, as the connection port CN is exposed, the connection port CN may be provided without reducing the display area.

Figure 14:
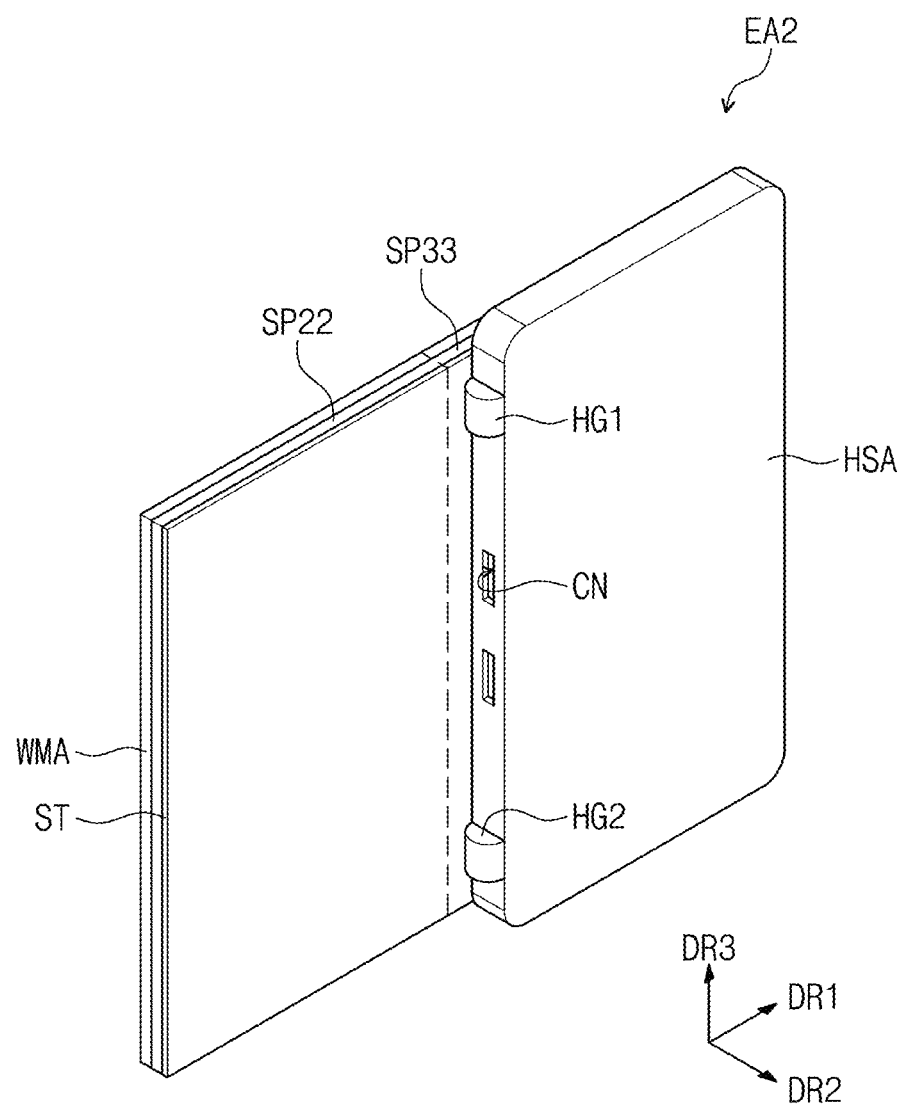
FIG. 14 is a perspective view illustrating still another exemplary embodiment of an electronic apparatus according to the inventive concept.

FIG. 14 is a perspective view illustrating still another exemplary embodiment of an electronic apparatus according to the inventive concept.

Referring to FIGS. 12 to 14, an electronic apparatus EA2 may further include hinges HG1 and HG2.

The hinges HG1 and HG2 may support a third surface portion SP33 of a display panel DPA. The hinges HG1 and HG2 may be fixed to a side surface of a housing HSA, which is exposed when the electronic apparatus EA2 operates in the second mode.

When the electronic apparatus EA2 converts from the second mode to the first mode, the third surface portion SP33 may be bent along the hinges HG1 and HG2. The hinges HG1 and HG2 may guide the bending of the third surface portion SP33.

The hinges HG1 and HG2 may be provided in plural. In the exemplary embodiment shown in FIG. 14, the hinges HG1 and HG2 exemplarily includes a first hinge HG1 and a second hinge HG2, which are spaced apart from each other with the connection port CN therebetween.

According to the exemplary embodiment of the inventive concept, the electronic apparatus may display an image on the entire surfaces having the approximately rectangular shape.

Also, the electronic apparatus may display an image on the entire surfaces having the rectangular shape when operates in the first mode, and expand the image display area, which is seen to a user, when operates in the second mode.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

Hence, the real protective scope of the present invention shall be determined by the technical scope of the accompanying claims.

What is claimed is:

1. An electronic apparatus comprising:
 a display panel comprising a first surface portion, a second surface portion, a third surface portion and a fourth surface portion, the third and fourth surface portions are disposed between the first surface portion and the second surface portion, wherein each of the first surface portion, the second surface portion, the third surface portion, and the fourth surface portion displays an image; and
 a window disposed on the display panel,
 wherein the display panel operates in one of a first mode and a second mode,
 in the first mode, the third surface portion and the fourth surface portion are bent from the first surface portion and are orthogonal to each other, and the second surface portion is bent from the third surface portion and the fourth surface portion, and
 in the second mode, the first surface portion, the second surface portion, and the third surface portion are substantially parallel to each other while the fourth surface portion maintains a bent state from the first surface portion.

2. The electronic apparatus of claim 1, wherein the display panel further comprises fifth and sixth surface portions each extending from the first surface portion, and
 in the first mode and the second mode, the fourth to sixth surface portions maintain a bent state from the first surface portion.

3. The electronic apparatus of claim 1, further comprising a bracket disposed below the display panel to support a portion of the display panel.

4. The electronic apparatus of claim 3, wherein the bracket supports the first surface portion and the fourth to sixth surface portions and does not support the third surface portion and the second surface portion.

5. The electronic apparatus of claim 1, further comprising a housing which provides an exterior of the electronic apparatus in conjunction with the window,
 wherein the housing supports and contacts the second surface portion and the third surface portion.

6. The electronic apparatus of claim 5, wherein in the first mode, a side surface of the housing and a portion of a rear surface of the housing are covered by the display panel, and
 in the second mode, the side surface of the housing and the portion of the rear surface of the housing are exposed to an outside.

7. The electronic apparatus of claim 5, wherein an accommodation groove is defined in a rear surface of the housing, and
 in the first mode, the second surface portion of the display panel is accommodated in the accommodation groove.

8. The electronic apparatus of claim 5, further comprising a holder attached to the housing or the second surface portion, and which fixes the second surface portion to the housing in the first mode.

9. The electronic apparatus of claim 5, further comprising a connection port disposed at a side surface of the housing.

10. The electronic apparatus of claim 9, wherein in the first mode, the connection port is covered by the third surface portion, and
 in the second mode, the connection port is exposed to an outside.

11. The electronic apparatus of claim 9, wherein the connection port comprises a USB port, an earphone port, or a microphone port.

12. The electronic apparatus of claim 5, further comprising a hinge fixed to a side surface of the housing, and which supports the third surface portion in the first mode.

13. The electronic apparatus of claim 1, further comprising a reinforcing portion attached to a lower portion of each of the second surface portion and the third surface portion to support the second surface portion and the third surface portion.

14. The electronic apparatus of claim 13, wherein the reinforcing portion has rigidity greater than rigidity of the display panel.

15. An electronic apparatus comprising:
 a display panel comprising a first surface portion, third to sixth surface portions bent and extending from four sides of the first surface portion, respectively, and a second surface portion bent and extending from the third surface portion, wherein each of the first surface portion, the third to sixth surface portions, and the second surface portion displays an image;
 a window disposed on the display panel;
 a bracket which supports the display panel; and
 a housing which provides an exterior of the electronic apparatus in conjunction with the window,
 wherein the display panel is bent at five places or more.

16. The electronic apparatus of claim 15, wherein the first surface portion and the second surface portion face each other and are substantially parallel to each other.

17. The electronic apparatus of claim 15, wherein the display panel further comprises a module hole passing through the second surface portion, and the module hole is surrounded by an area which displays the image in the second surface portion.

18. The electronic apparatus of claim 17, further comprising an electronic module disposed between the first surface portion and the second surface portion, overlapping the module hole in a direction that the module hole passes through the second surface portion, and which receives an external input or provide a signal to an outside through the module hole.

19. The electronic apparatus of claim 15, wherein the display panel further comprises a module hole passing through at least one of the third to sixth surface portions, and the module hole is surrounded by an area which displays the image in the at least one of the third to sixth surface portions.

20. The electronic apparatus of claim 19, further comprising an electronic module disposed below the first surface portion, overlapping the module hole in a direction that the module hole passes through the at least one of the third to sixth surface portions, and which receives an external input or provide a signal to an outside through the module hole.

* * * * *